United States Patent
Ozluturk

(10) Patent No.: US 7,499,393 B2
(45) Date of Patent: Mar. 3, 2009

(54) PER STREAM RATE CONTROL (PSRC) FOR IMPROVING SYSTEM EFFICIENCY IN OFDM-MIMO COMMUNICATION SYSTEMS

(75) Inventor: Fatih Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 676 days.

(21) Appl. No.: 11/189,649

(22) Filed: Jul. 26, 2005

(65) Prior Publication Data
US 2006/0034164 A1 Feb. 16, 2006

Related U.S. Application Data

(60) Provisional application No. 60/600,742, filed on Aug. 11, 2004.

(51) Int. Cl.
*H04J 11/00* (2006.01)
(52) U.S. Cl. ..................... 370/208; 370/335
(58) Field of Classification Search .......... 370/208, 370/210, 267, 203, 204, 205, 206, 209, 328, 370/329, 330, 335, 342, 441, 334, 435; 375/299, 375/316, 130, 260, 267, 346, 347, 358; 455/101
See application file for complete search history.

(56) References Cited

U.S. PATENT DOCUMENTS

| | | | | |
|---|---|---|---|---|
| 6,985,434 | B2 * | 1/2006 | Wu et al. | 370/208 |
| 7,317,750 | B2 * | 1/2008 | Shattil | 375/146 |
| 7,415,074 | B2 * | 8/2008 | Seto et al. | 375/260 |
| 2002/0154705 | A1 | 10/2002 | Walton et al. | |
| 2003/0086371 | A1 | 5/2003 | Walton et al. | |

FOREIGN PATENT DOCUMENTS

| | | |
|---|---|---|
| WO | 01/71928 | 9/2001 |
| WO | 03/041300 | 5/2003 |

* cited by examiner

*Primary Examiner*—Chi H Pham
*Assistant Examiner*—Alexander Boakye
(74) *Attorney, Agent, or Firm*—Volpe and Koenig, P.C.

(57) ABSTRACT

A transmitter splits a user-data stream into a plurality of sub-streams. The transmitter then adaptively selects a modulation scheme and coding rate for each of the sub-streams based on current channel conditions. Next, a plurality of sub-carriers are modulated and encoded with the sub-stream data according to the selected modulation schemes and coding rates. The modulated sub-carriers are each allocated to one or more transmit antennas for transmission. Prior to transmission, a transmission power for each of the sub-carriers is adjusted based on the channel conditions. The adaptive modulation and coding function, the sub-carrier allocation function, and the power control function are jointly controlled to optimize throughput, signal quality, and system efficiency.

13 Claims, 2 Drawing Sheets

PER STREAM RATE CONTROL (PSRC) FOR IMPROVING SYSTEM EFFICIENCY IN OFDM-MIMO COMMUNICATION SYSTEMS

CROSS REFERENCE TO RELATED APPLICATIONS

This application claims the benefit of U.S. Provisional Application No. 60/600,742 filed Aug. 11, 2004, which is incorporated by reference as if fully set forth.

FIELD OF INVENTION

The present invention relates to wireless communication systems. More particularly, the present invention is a method and apparatus for improving channel and system capacity in wireless communication systems.

BACKGROUND

Orthogonal Frequency Division Multiplexing (OFDM) refers to a data transmission scheme wherein a data stream is split into smaller sub-streams and transmitted using sub-carriers, each having a smaller bandwidth than the total available transmission bandwidth. The efficiency of OFDM results from the orthogonality of the sub-carriers. That is to say, the sub-carriers are selected such that they do not interfere with each other during transmission.

Multiple-Input Multiple-Output (MIMO) refers to a wireless transmission and reception scheme wherein communication devices employ multiple antennas to transmit and receive communication signals. A MIMO system takes advantage of the spatial diversity or spatial multiplexing options created by the presence of multiple antennas. In addition, a MIMO system improves signal quality, such as for example signal-to-noise ratio (SNR), and increases data throughput.

For practical reasons, OFDM may be preferred over other transmission schemes such as Code Division Multiple Access (CDMA), particularly in MIMO communication systems. When user data is split into sub-streams and carried by different sub-carriers, for example, the effective data rate on each sub-carrier is less than the total transmit data rate. As a result, the symbol duration of data transmitted with an OFDM scheme is much larger than the symbol duration of data transmitted with other schemes. Larger symbol durations are preferable as they can tolerate larger delay spreads. To illustrate, data transmitted with large symbol duration is typically less affected by multi-path than data transmitted with shorter symbol duration. Accordingly, OFDM symbols can overcome delay spreads that are common in wireless communications without the use of overly complicated receivers.

A continuing challenge for all types of wireless communications systems, including those employing OFDM- and CDMA-type transmission schemes, is the efficient use of available system resources, particularly during the transmission of data. In MIMO systems, this challenge becomes even more significant as multiple data streams are transmitted simultaneously.

A conventional approach utilized in CDMA communication systems to improve system efficiency is referred to as Per Stream Rate Control (PSRC). PSRC is a scheme particularly designed for use in CDMA systems whereby bandwidth, transmit power, and other resources are assigned to a transmitter based on channel conditions as seen by that transmitter. In CDMA systems having multiple transmitters and/or receivers, resources are similarly allocated on a per-transmit-antenna basis. There does not exist, however, a PSRC-type scheme for improving system efficiency in OFDM-MIMO communication systems.

Accordingly, it is desirable to have a method and apparatus for improving system efficiency in OFDM-MIMO communication systems.

SUMMARY

The present invention is a method and apparatus for improving system efficiency in Orthogonal Frequency Division Multiplexing (OFDM) Multiple-Input, Multiple-Output (MIMO) wireless communication systems. In a transmitter, a user-data stream is split into a plurality of sub-streams. The transmitter then adaptively selects a modulation scheme and coding rate for each of the sub-streams based on current channel conditions. Next, a plurality of sub-carriers is modulated and encoded with the sub-stream data according to the selected modulation schemes and coding rates. The modulated sub-carriers are then allocated to one or more transmit antennas for transmission. Prior to transmission, a transmission power for each of the sub-carriers is adjusted, also based on the current channel conditions. The adaptive modulation and coding function, the sub-carrier allocation function, and the power control function are jointly controlled to optimize throughput, signal quality, and system efficiency.

DETAILED DESCRIPTION OF THE PREFERRED EMBODIMENTS

Figure 1:
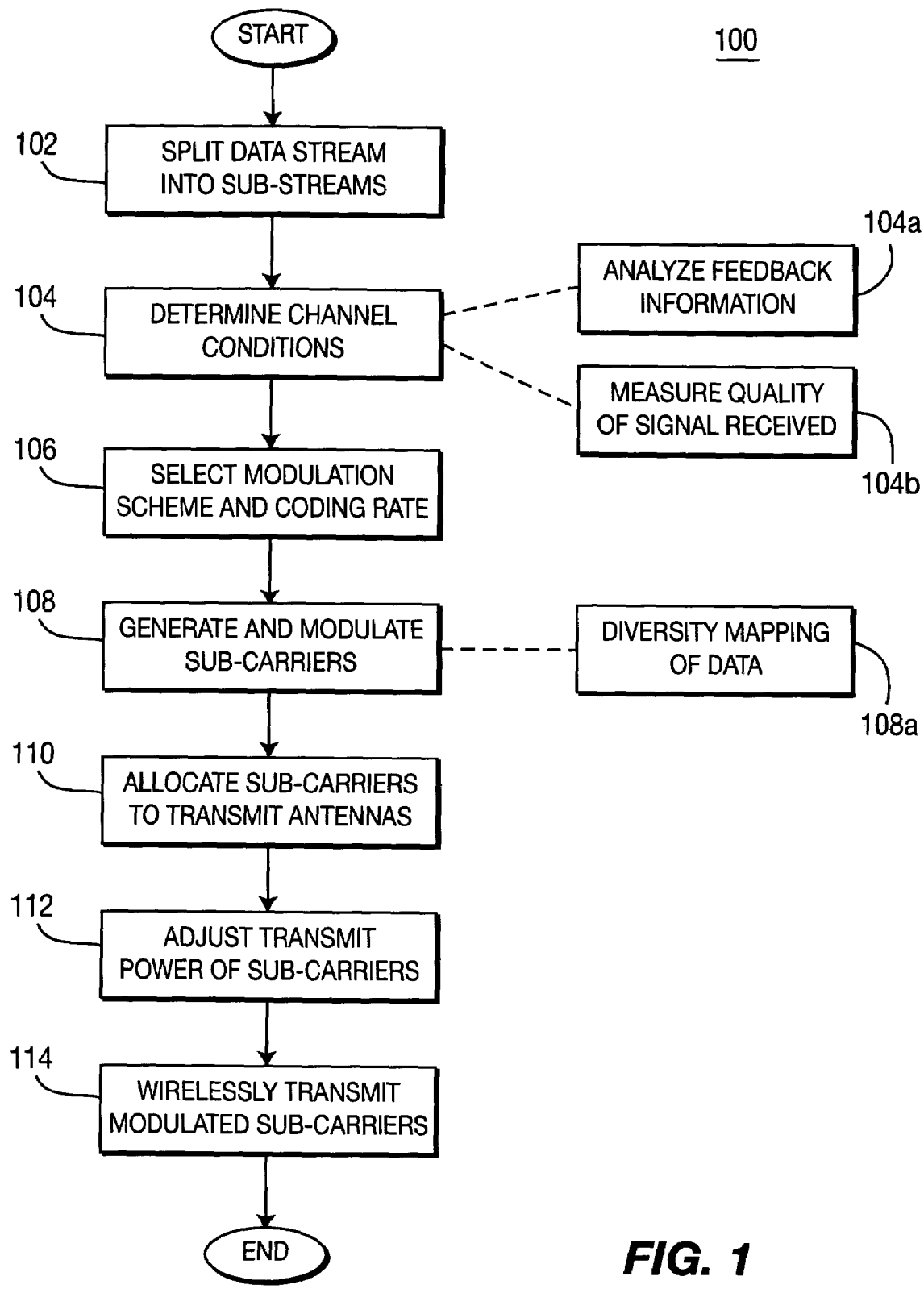
FIG. 1 is a flow diagram illustrating a Per Stream Rate Control (PSRC) scheme as applied to Orthogonal Frequency Division Multiplexing (OFDM) Multiple-Input, Multiple-Output (MIMO) communication systems for improving system efficiency.

Herein, a wireless transmit/receive unit (WTRU) includes but is not limited to a user equipment, mobile station, fixed or mobile subscriber unit, pager, or any other type of device capable of operating in a wireless environment. When referred to herein, a base station includes but is not limited to a Node-B, site controller, access point or any other type of interfacing device in a wireless environment.

In a preferred embodiment, a per stream rate control (PSRC) scheme is adapted for use in OFDM-MIMO communications systems. This PSRC scheme applies, for example, common CDMA techniques, including adaptive modulation and coding (AMC) and power control, to OFDM-MIMO systems to improve system efficiency.

In accordance with the present embodiment, an OFDM-MIMO transmitter splits a user-data stream into a plurality of smaller, sub-streams. Then, using feed back information provided by a receiver, the transmitter determines channel conditions for each of a plurality of sub-carriers. Alternatively, the transmitter may determine channel conditions by measuring predetermined quality metric(s) of received signals. Determining channel conditions enables the transmitter, for example, to understand how particular channels affect the various transmission parameters (i.e., amplitude, phase, etc.) of signals as they propagate through the channel. As further described below, this understanding is useful for properly allocating bandwidth, power, and other system resources to sub-carriers for transmission.

Once the channel conditions are determined, the transmitter selects a modulation scheme and a coding rate for each sub-carrier. Preferably, the transmitter utilizes an adaptive modulation and coding (AMC) technique, adaptive to channel conditions, in making these selections. To illustrate, if the signal-to-interference-plus-noise (SINR) of a communication link between a transmitter and a receiver is high, the transmitter adaptively increases its data transmission rate to the receiver using a higher order modulation and rate coding. As the SINR of the communication link changes, the modulation format and coding rate are similarly adjusted to match current channel conditions.

Next, the sub-carriers are modulated with the data sub-streams according to the selected modulation scheme and coding rate. Optionally, to ensure signal diversity during transmission, the transmitter may map particular sub-streams to multiple sub-carriers for transmission. In this way, any data that is lost due to carrier interference may be easily recovered at the receiver.

Each of the modulated sub-carriers is then allocated to one or more transmit antennas for transmission to the receiver. The sub-carriers may be allocated to the transmit antennas by any appropriate allocation scheme. Preferably, however, sub-carriers are allocated to the antenna(s) which maximize the sub-carriers' transmit quality. By allocating sub-carriers to multiple antennas, the quality of the data transmission and hence, the quality of a communication link between the transmitter and a receiver is increased. It should be noted, however, that this increase in quality may come at the expense of throughput. This is particularly true when a large number of sub-carriers are allocated to a single antenna or when large amounts of data are being transmitted. Accordingly, sub-carriers are preferably allocated for transmission in view of both a desired transmission quality and a desired throughput level.

Optionally, prior to transmission, the transmitter selectively adjusts a transmission power for each of the sub-carriers. Once the transmit power is adjusted, the transmitter wirelessly transmits the data sub-streams to a receiver via its plurality of transmit antennas.

The AMC, sub-carrier allocation, and power control functions described above collectively enable a transmitter to transmit data streams in a manner that improves data throughput, increases a transmitter's efficiency, and increases the overall efficiency of the wireless communication system. To assure optimal transmit quality and resource allocation, the transmitter may optionally employ a joint control mechanism to monitor the AMC, sub-carrier allocation, and power adjustment functions simultaneously. This joint control mechanism is aware of available resources, desired throughput rates, and transmit-quality requirements, and accordingly, ensures that a harmonic balance is maintained between the three.

Referring now to FIG. 1, a flow diagram 100 illustrating a per-stream rate control scheme for use in OFDM-MIMO wireless communication systems is shown. A transmitter configured to operate in OFDM-MIMO communication systems splits a user-data stream into a plurality of smaller, sub-streams (step 102). Next, the transmitter determines channel conditions for each of a plurality of sub-carriers (step 104). These channel conditions are determined by either analyzing feed back information provided by a receiver (step 104a), or alternatively, the transmitter may measure predetermined quality metric(s) of signals received in the transmitter (step 104b). Once the channel conditions are known (step 104), the transmitter adaptively selects a modulation scheme and coding rate for each sub-stream (step 106), preferably using an AMC technique. This selection step (step 106) is adaptive in that as channel conditions change, (on a per sub-carrier basis), so too will the selected modulation schemes and coding rates.

Next, sub-carriers are generated and modulated with the data sub-streams according to the selected modulation schemes and coding rates (step 108). Optionally, to ensure signal diversity during transmission, the transmitter may allocate redundant data bits to different sub-carriers (step 108a). This redundancy enables a receiver to easily recover data that is lost due to, for example, carrier interference.

Each of the modulated sub-carriers (step 108) is then allocated to one or more transmit antennas (step 110) based on each sub-carrier's frequency response from a particular antenna. Preferably, the sub-carriers are allocated (step 110) in a manner that balances transmit quality, (achieved by allocating sub-carriers to multiple antennas), with data throughput, which may decrease if a large number of sub-carriers are transmitted from a single or a few particular antennas. Prior to transmission, the transmitter selectively adjusts a transmission power for each of the sub-carriers (step 112). Once the transmission power is adjusted (step 112), the transmitter wirelessly transmits the data-modulated sub-carriers to a receiver (step 114) via its plurality of transmit antennas.

It should be noted that the AMC (step 106), sub-carrier allocation (step 110), and power control (step 112) functions are preferably jointly controlled, thus enabling a transmitter to balance available resources, transmit-quality, and data throughput.

Figure 2:
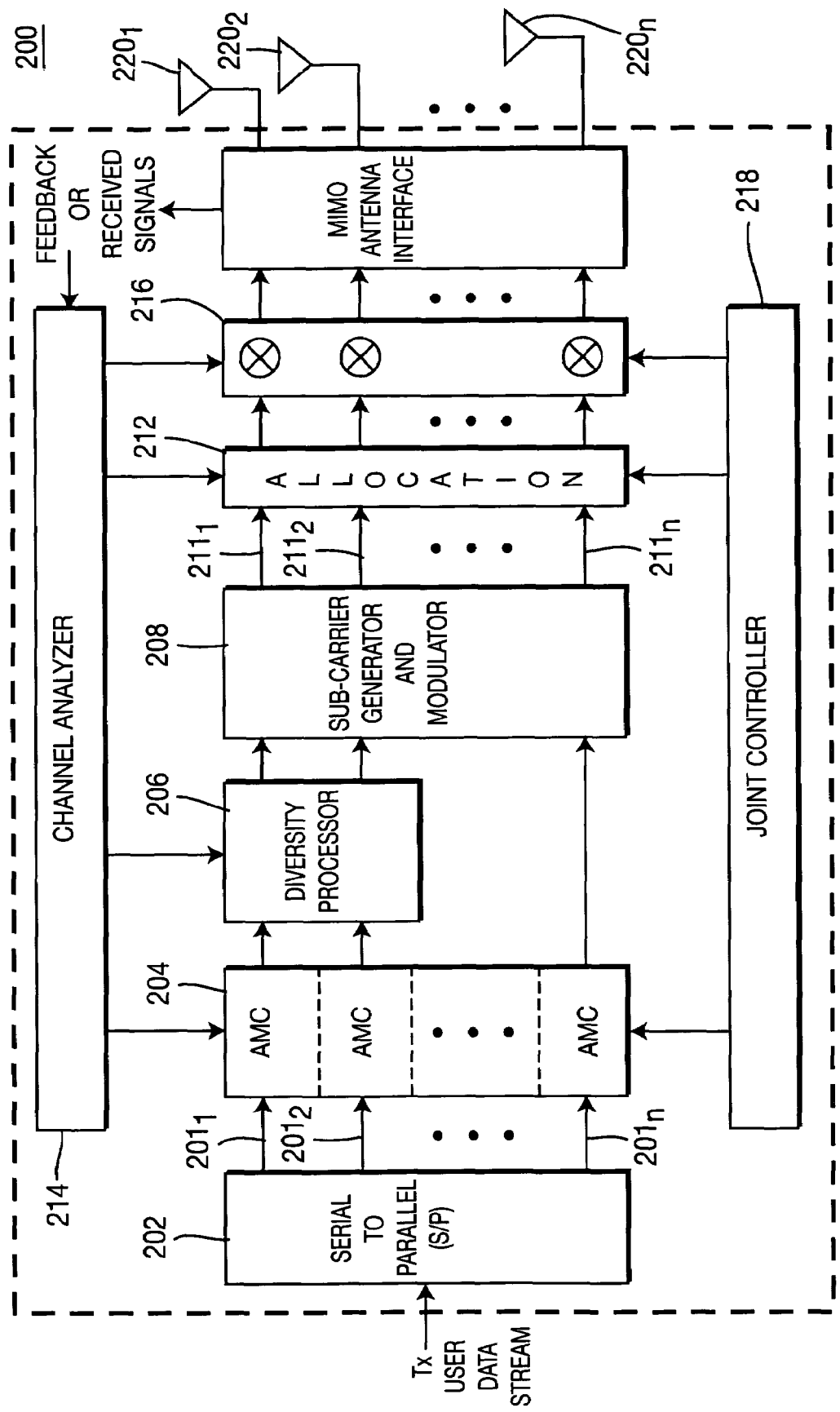
FIG. 2 is an OFDM-MIMO transmitter configured to use the PSRC scheme illustrated in FIG. 1.

Referring now to FIG. 2, an OFDM-MIMO transmitter 200 configured to implement a PSRC transmission scheme is shown. The transmitter comprises a serial to parallel (S/P) processor 202, an adaptive modulation and coding (AMC) device 204, a diversity processor 206, a sub-carrier generator/modulator 208, an allocation processor 212, a channel analyzer 214, a power controller 216, a joint controller 218, and a plurality of transmit/receiver antennas $220_1, 220_2, \ldots 220_n$.

A user-data stream received in the transmitter 200 is split into a plurality of sub-streams $201_1 \ldots 201_n$ via the S/P processor 202. These sub-streams $201_1 \ldots 201_n$ are then sent to the AMC processor 204 wherein a modulation scheme and coding rate for each sub-stream $201_1 \ldots 201_n$ is selected according to current channel conditions. The AMC processor 204 is adaptive in that its modulation and coding selections change as the channel conditions change. Channel condition information is provided to the AMC processor 204 by the channel analyzer 214. In the channel analyzer 214, feed back information provided by a receiver (not shown) is analyzed on a per sub-carrier basis. Alternatively, the channel analyzer 214 can measure quality metric(s) of signals received in the transmitter 200 and thereby determines a per sub-carrier channel quality.

Once the modulation and coding schemes have been selected, the diversity processor 206 redundantly maps certain sub-streams to a plurality of sub-carriers generated by the sub-carrier generator/modulator 208. Channel information provided by the channel analyzer 214 is utilized by the diversity processor 206 in its mapping function. This redundant data mapping is not necessary for all data sub-streams $201_1 \ldots 201_n$, however, it is useful in ensuring signal diversity during transmission, particularly when channel conditions are poor and/or when large amounts of data are being transmitted.

Next, the sub-carrier generator/modulator 208 modulates and encodes the sub-carriers according to the selected modulation schemes and coding rates. The modulated sub-carriers $211_1, 211_2 \ldots 211_n$, are then allocated, via the allocation processor 212, to one or more antennas $220_1, 220_2, \ldots 220_n$ for transmission. The allocation processor 212 utilizes channel information provided by the channel analyzer 214 to determine which antenna(s) provide the sub-carriers with the best possible frequency response.

Prior to transmission, the power controller 216 selectively adjusts a transmission power for each of the sub-carriers $211_1, 211_2, \ldots 211_n$. These adjustments are based on channel information provided by the channel analyzer 214. This power control function ensures that each sub-carrier $211_1, 211_2, \ldots 211_n$ is transmitted with sufficient power to ensure successful reception at a receiver, without unnecessarily wasting power resources on high quality sub-carriers.

To ensure a proper balance between rate control, sub-carrier allocation, and power control, the joint controller 218 monitors and controls the AMC device 204, allocation processor 212, and power controller 216 simultaneously. By jointly controlling these devices 204, 212, 216, the transmitter 200 can optimize data throughput and signal quality while efficiently utilizing available system resources.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for improving efficiency in Orthogonal Frequency Division Multiplexing (OFDM) Multiple-Input, Multiple-Output (MIMO) wireless communications comprising:
    splitting a user-data stream into a plurality of sub-streams in a transmitter;
    determining current channel conditions for each of a plurality of sub-carriers;
    adaptively selecting a modulation scheme and coding rate for each of the plurality of sub-streams;
    modulating and encoding the plurality of sub-carriers with the sub-stream data according to the selected modulation schemes and coding rates;
    allocating the sub-carriers to transmit antennas for transmission; and
    transmitting the sub-stream encoded sub-carriers;
    wherein the adaptively selecting a modulation scheme and coding rating and allocating the sub-carriers are performed with regard to each other.

2. The method of claim 1, further comprising adjusting a transmission power for each sub-carrier based on the determined channel conditions; wherein the power adjusting the adaptively selecting a modulation scheme and coding rate and allocating the sub-carriers are performed with regard to each other.

3. The method of claim 1, wherein the determining current channel conditions for each of a plurality of sub-carriers comprises measuring predetermined quality metrics of a signal received in the transmitter.

4. The method of claim 1, wherein the determining current channel conditions comprises:
    measuring a quality metric of a signal received;
    receiving feed back information based on the quality measurements; and
    analyzing the feed back information and determining current channel conditions.

5. The method of claim 1, further comprising:
    allocating sub-streams to sub-carriers for transmission based on the determined channel conditions.

6. The method of claim 5, wherein sub-streams are allocated to multiple sub-carriers for transmission.

7. The method of claim 1, wherein allocating the sub-carriers comprises allocating a group of sub-carriers to a group of transmit antennas for transmission, the group of sub-carriers including at least one sub-carrier and the group of transmit antennas including at least one transmit antenna.

8. A transmitter configured to operate in OFDM-MIMO wireless communications comprising:
    a serial to parallel (S/P) processor configured to split datastreams into a plurality of sub-streams;
    an adaptive modulation and coding (AMC) device configured to select a modulation scheme and coding rate for each of the plurality of sub-streams based on current channel conditions;
    a sub-carrier generator and modulator configured to generate a plurality of sub-carriers and modulating them with sub-stream data according to the selected modulation schemes and coding rates;
    an allocation processor configured to allocate modulated sub-carriers to at least one antenna for transmission;
    a channel analyzer configured to determine current channel conditions and to provide the channel condition information to the AMC device, allocation processor, and power controller; and
    a plurality of transmit/receive antennas configured to receive and transmit signals on a plurality of sub-carriers.

9. The transmitter of claim 8, further comprising:
    a power controller configured to selectively adjust a transmit power of each of the modulated sub-carriers.

10. The transmitter of claim 8, further comprising:
    a diversity processor configured to map sub-stream data to multiple sub-carriers based on channel condition information, wherein the channel analyzer is further configured to provide the channel condition information to the diversity processor.

11. The transmitter of claim 8, wherein the channel analyzer is further configured to measure quality metrics of signals received in the transmitter and determine current channel conditions based on the measurements.

12. The transmitter of claim 8, wherein the channel analyzer is further configured to process feed back information provided by a receiver, analyze the feed back information, and determine current channel conditions based on the analysis.

13. The transmitter of claim 9, further comprising a joint controller configured to jointly control the AMC device, the allocation processor, and the power controller.

* * * * *